United States Patent [19]
Haggerty et al.

[11] Patent Number: 5,527,004
[45] Date of Patent: Jun. 18, 1996

[54] CONTROL SYSTEM FOR AIRCRAFT

[75] Inventors: Matthew K. Haggerty, Milton; Clay A. Burns, Boston, both of Mass.

[73] Assignee: Helix Air, Inc., Norwood, Mass.

[21] Appl. No.: 187,882

[22] Filed: Jan. 28, 1994

Related U.S. Application Data

[63] Continuation-in-part of Ser. No. 21,752, Feb. 24, 1993.

[51] Int. Cl.⁶ .................................................. B64C 13/12
[52] U.S. Cl. ............................................. 244/229; 244/234
[58] Field of Search ................................... 244/230, 234, 244/235, 75 R

[56] References Cited

U.S. PATENT DOCUMENTS

| | | | |
|---|---|---|---|
| D. 135,167 | 11/1942 | Obszarny et al. . | |
| 792,573 | 6/1905 | Duryea . | |
| 1,798,724 | 3/1931 | Chalmers . | |
| 1,807,939 | 6/1931 | Sikorsky . | |
| 1,855,988 | 4/1932 | Ranasey . | |
| 1,874,522 | 8/1932 | Henrichsen . | |
| 2,272,817 | 2/1942 | Palmer | 244/84 |
| 3,228,478 | 1/1966 | Edenborough | 170/160.26 |
| 3,271,045 | 9/1966 | Vacante | 280/87 |
| 3,785,596 | 1/1974 | Chinchester-Miles | 244/230 |
| 3,941,009 | 3/1976 | Brown | 74/473 |
| 3,994,453 | 11/1976 | Firestone | 244/118 |
| 4,114,843 | 9/1978 | Robinson . | |
| 4,726,311 | 2/1988 | Niina | 114/144 |
| 4,811,921 | 3/1989 | Whitaker et al. . | |
| 4,887,782 | 12/1989 | Carnell et al. | 244/234 |

FOREIGN PATENT DOCUMENTS

| | | |
|---|---|---|
| 962426 | 5/1944 | France . |
| 997200 | 6/1945 | France . |
| 471583 | 2/1937 | United Kingdom . |

*Primary Examiner*—Galen L. Barefoot
*Attorney, Agent, or Firm*—Hamilton, Brook, Smith & Reynolds

[57] ABSTRACT

A control mechanism for aircraft having a vertically extending, member with a cross bar attached to its upper end and a pair of arcuate lower members extending from the cross bar toward the forward end of the aircraft with an adjustable positioning arm on each lower member extending rearwardly and which mounts a hand grip for controlling the aircraft. The mechanism includes a damping system with a frame connected to the crossbar with bearing elements.

20 Claims, 19 Drawing Sheets

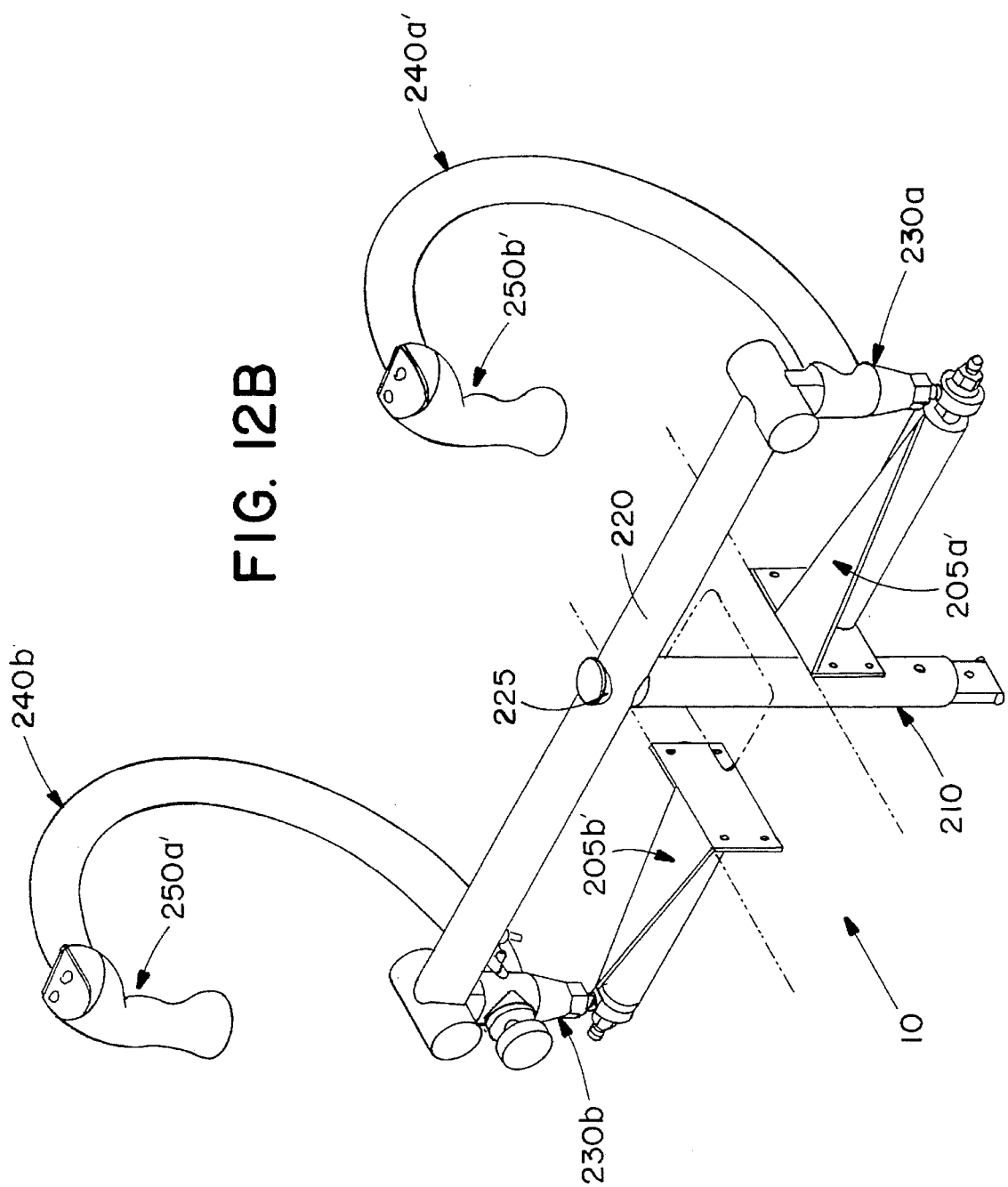

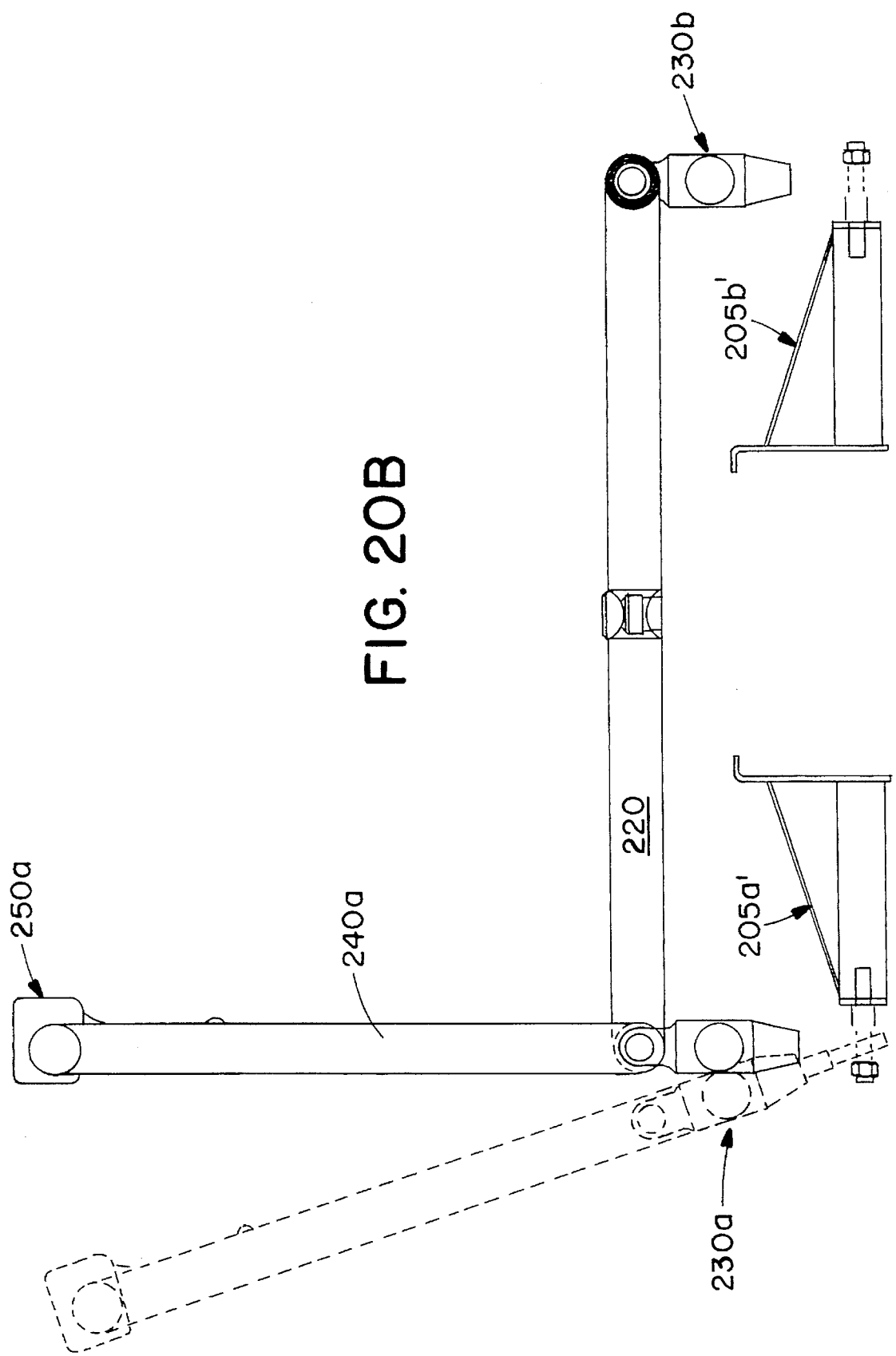

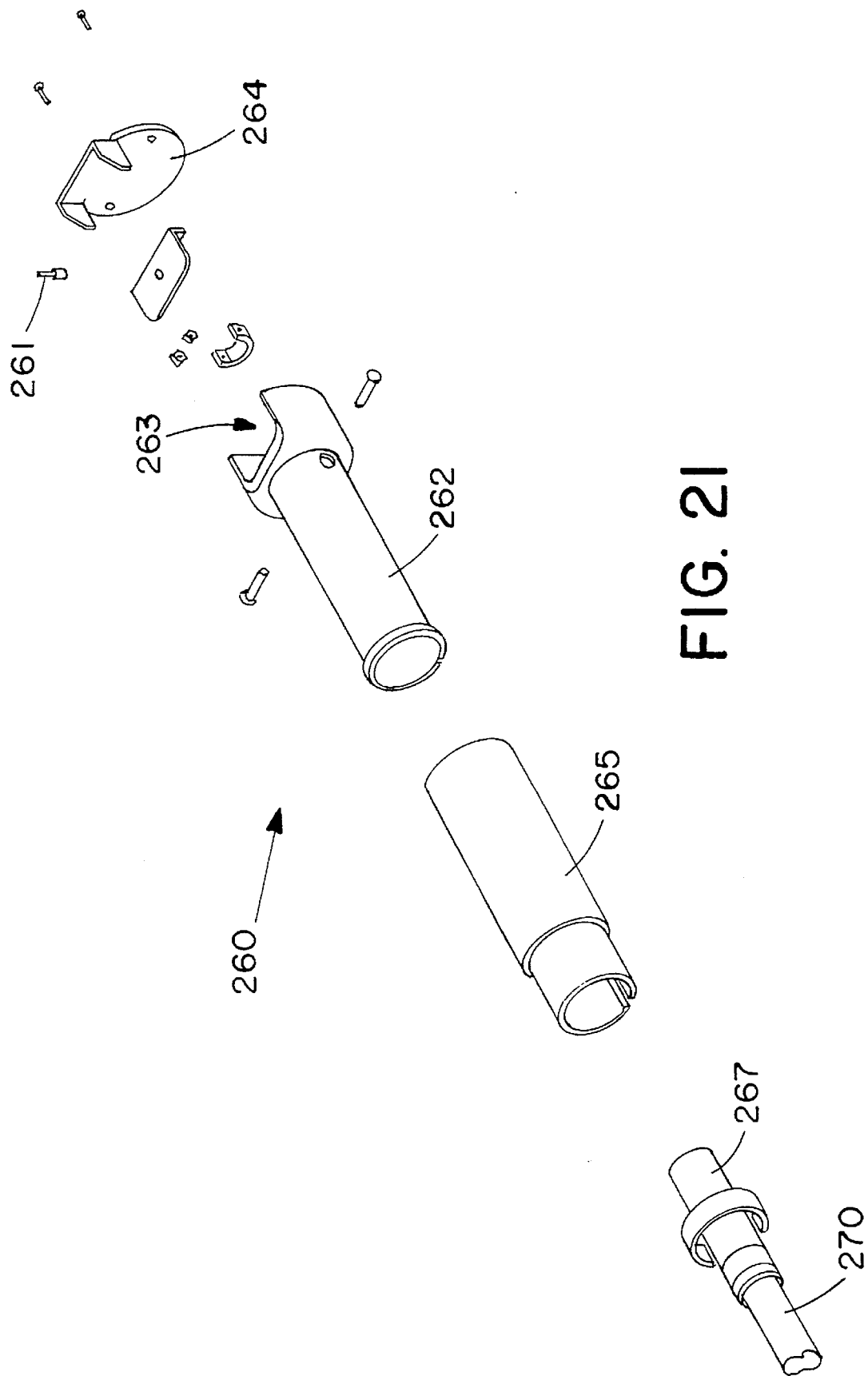

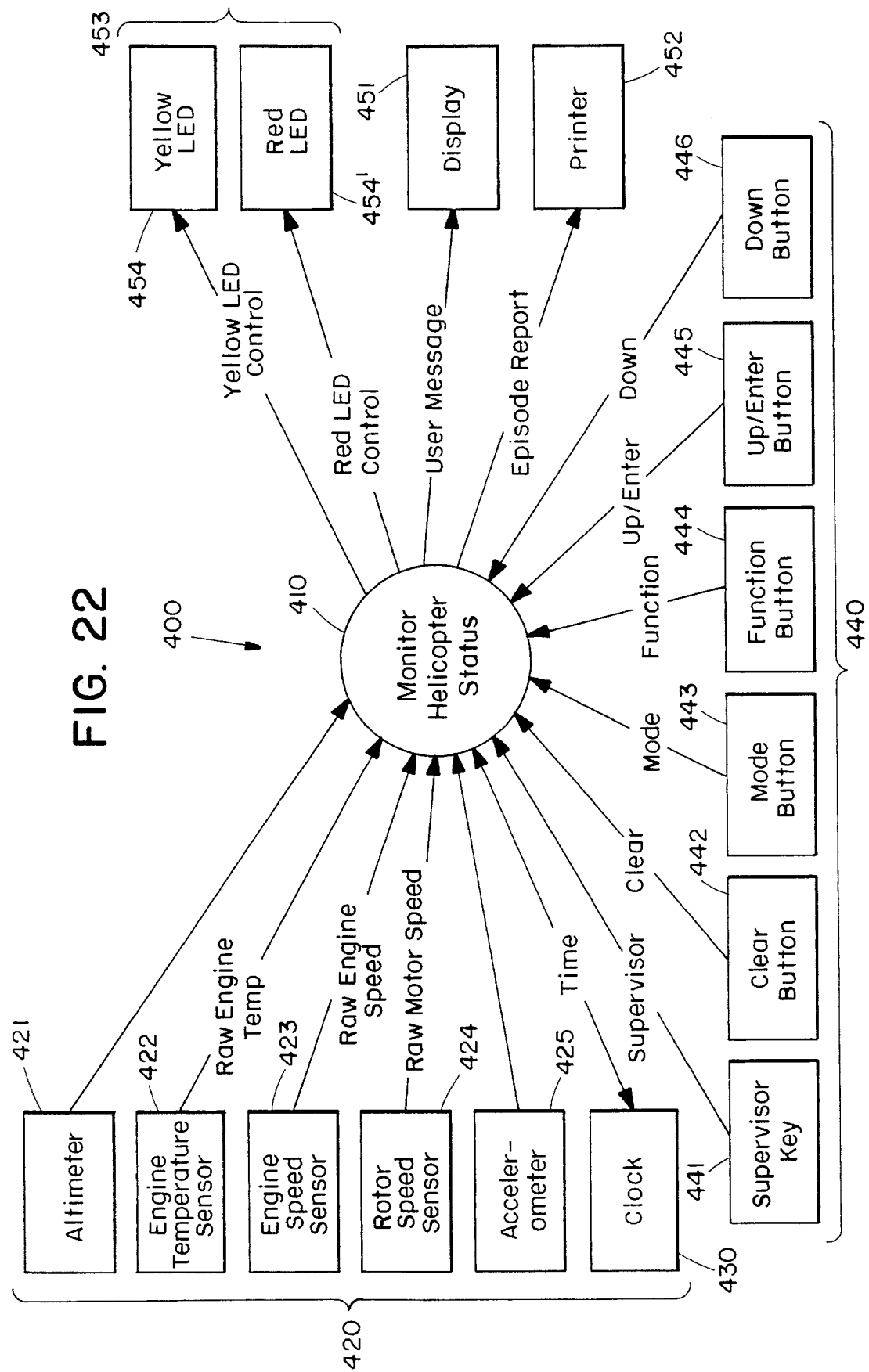

CONTROL SYSTEM FOR AIRCRAFT

RELATED APPLICATIONS

This application is a continuation-in-part of copending U.S. Ser. No. 08/021,752 filed Feb. 24, 1993.

BACKGROUND OF THE INVENTION

This invention relates to control mechanism for aircraft, more particularly to a single or dual control system operating through a single stick.

There are numerous control mechanisms today for operating the elevator and ailerons of fixed wing aircraft and/or for controlling the cyclic pitch of the rotor of a helicopter. In a single passenger aircraft, the stick is located in front of the pilot and his knees normally straddle the stick. The same is true of dual passenger tandem aircraft. In dual control aircraft where the pilot and copilot or pilot and passenger are seated side by side, each has a stick normally extending upwardly from linkage mechanism below the floor level.

One of the problems with the latter arrangement, i.e., where a pilot and copilot sit side by side, is the need for a relatively complex mechanism to interconnect the two control sticks so that they can move together in side by side and fore and aft directions simultaneously. Another problem is that the vertically extending stick makes access to the aircraft somewhat difficult.

These and other problems were addressed in U.S. Pat. No. 4,114,843, which issued Sep. 19, 1978 to Robinson. Robinson disclosed a control mechanism mounted on the center line of the aircraft for the dual control of aircraft having a single vertically extending stick for controlling both longitudinal and lateral orientation of the aircraft. A crossbar was secured to the stick which was connected to a single axis rotational joint permitting both fore and aft and lateral movement of the aircraft by grips located on both ends of the crossbar. The rotational joint, in turn, was connected to mechanism for moving the ailerons, elevator or for controlling the rotor blades of a helicopter.

The crossbar was hinged on the upper end of the stick and was freely pivotal in a vertical plane extending transversely to the axis of the aircraft. The grips, which were mounted on the ends of the crossbar, extend downwardly toward the cockpit floor.

While the Robinson control stick assembly solved many of the problems associated with older constructions of dual controls, the central, upwardly extending stick prevented complete access to the main instrument panel controls. It and the crossbar as mounted impaired visibility of the main instrument panel displays, and inhibited accessibility to the panel controls and instruments. The fact that the crossbar pivoted up and down permitted one grip to be located at a convenient place for one of the two pilots, but in instances where the grip were near the pilot's lap, the other grip, by necessity, would be elevated to a position away from the immediate comfortable access position of the other pilot. In the instance where both pilots have their hands on the grip, as for example, in a teaching process, with one grip elevated and the other one depressed, either or both of the pilots could have their hands in an uncomfortable position.

It is to these problems that the present invention is directed.

SUMMARY OF THE INVENTION

The present invention resides in a control mechanism to effect lateral and longitudinal movement of an aircraft of either the fixed or rotary wing type. The invention will be illustrated with respect to a rotary wing aircraft which will be defined, in part, as having a forward end, a rearward end and a central axis as reference data. A short stub extends vertically upwardly from the floor or a portion of the cockpit close to the floor and is located essentially on the central axis of the aircraft between the pilot and copilot seats which are side by side on opposite sides of the axis. The lower end of the stub is engagable with conventional aircraft control means such as a rudder, ailerons, cyclic control mechanism, etc. A crossbar is secured to the upper end of the stub which is close to the floor and extends transversely of the central axis extending from the stub outwardly in both directions.

A pair of arcuate lower members are attached to and extend from the crossbar, one on each side of the axis of the aircraft. The lower members extend toward the forward end of the aircraft substantially parallel with the axis. They then curve upwardly and terminate in a distal end. A positioning arm is pivotally secured to the distal end of each lower member and extends toward the rearward end of the aircraft. A pilot handgrip is secured to each positioning arm.

The positioning arms are pivotally mounted, each to its own associated lower member, to permit independent heightwise adjustment of each handgrip relative to the level of the crossbar to make its height independent of the height of the other grip.

The hand grips may each be pivotally mounted on its associated positioning arm to permit independent angular adjustment of the grip relative to axes parallel with the central axis of the aircraft.

This structure also provides planar motion of the grip through full arc travel of the stick and also allows full clearance of grip positioning arm from legs.

At least one of the arcuate lower members may be releasably secured to the crossbar to permit its removal and, optionally, both may be releasably secured to permit greater access to the cockpit for cleaning, etc.

The pivoted arm may be attached to the stick of a single control. The pivoted positioning arm on the single conventional stick also allows planar motion of the grip through the full arc travel of the stick.

Normally, the pivoted arm will descend toward the floor under its own weight. The present invention contemplates providing a counterbalance for the arm where it is on a single or dual control mechanism.

Other advantages are: improved access to cockpit, pilot comfort and reduced fatigue, planar motion of grip, ability to move grip around legs and other obstacles to full travel of control stick.

The above and other features of the invention including various and novel details of construction and combination of parts will now be more particularly described with reference to the accompanying drawings and pointed out in the claims. It will be understood that the particular control mechanism for aircraft embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIGS. 12A–12B are schematic diagrams illustrating preferred embodiments of a dampened split cyclic control.

FIG. 20B is a schematic diagram illustrating the central tube and bearing assembly undergoing lateral motion.

FIG. 21 is a schematic diagram illustrating a collective control grip according to a preferred embodiment of the invention.

FIG. 22 is a schematic block diagram illustrating the functionality of a preferred embodiment of a Health and Usage Monitoring System.

DETAILED DESCRIPTION OF PREFERRED EMBODIMENTS OF THE INVENTION

Figure 1:
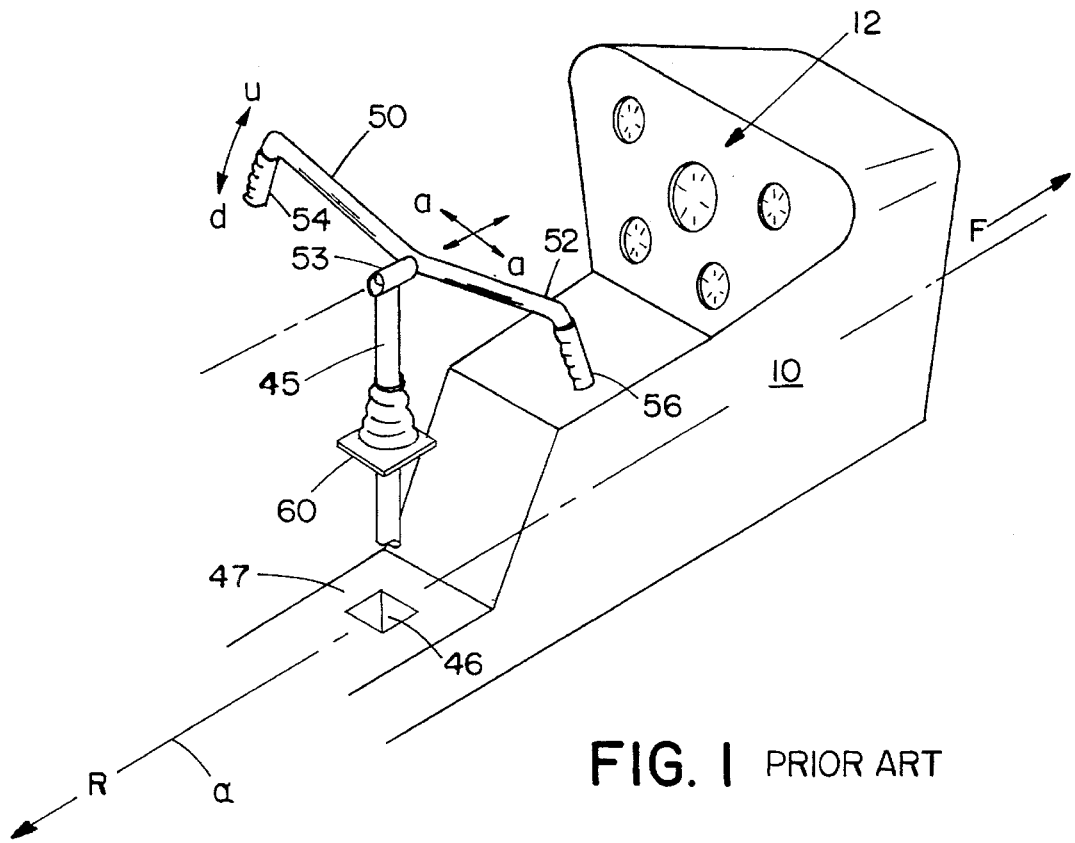
FIG. 1 is a perspective view of a dual control mechanism illustrating the prior art.

FIG. 1 is a representative illustration of a prior art dual control mechanism of the type disclosed in Robinson U.S. Pat. No. 4,114,843. It includes an instrument console generally designated 10 located on a central axis α which is the axis of the aircraft which, in turn, has a forward end in the direction of the arrow designated F and a rearward end in the direction of an arrow designated R. The same nomenclature will be employed with reference to the illustrative example of the present invention.

Figure 3:
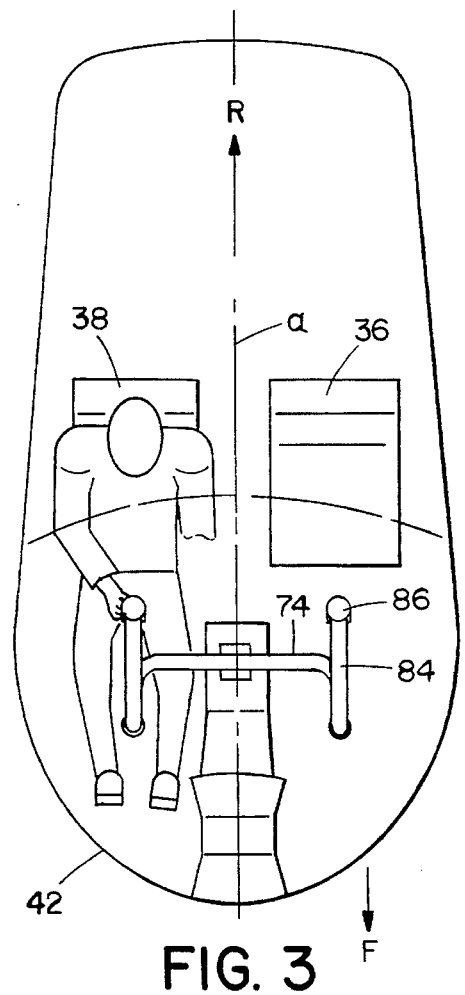
FIG. 3 is a plan schematic view of the dual control mechanism in a helicopter.
Figure 4:
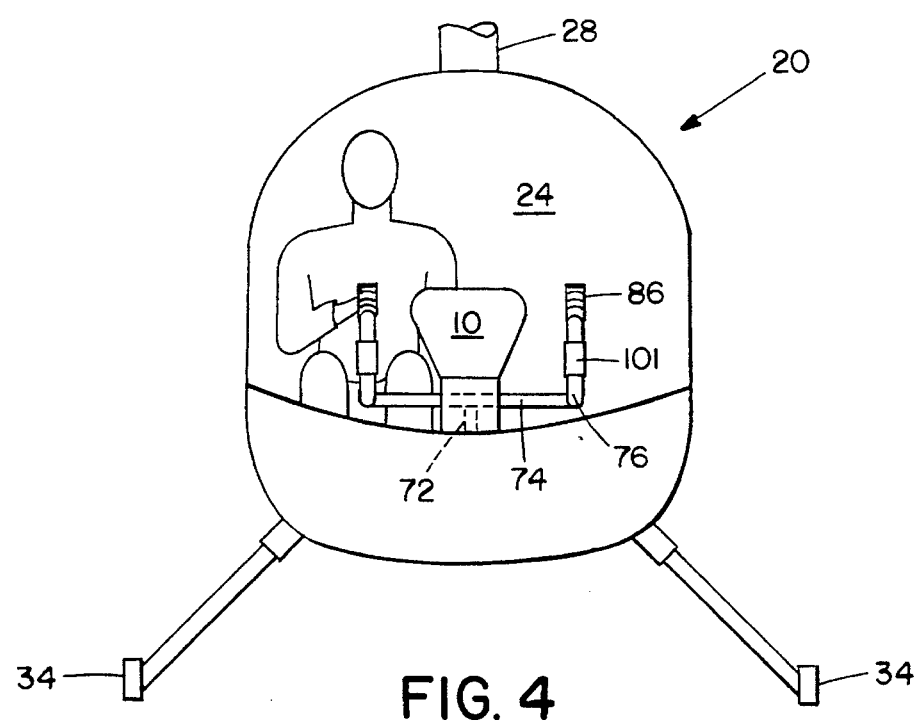
FIG. 4 is a front view thereof.
Figure 5:
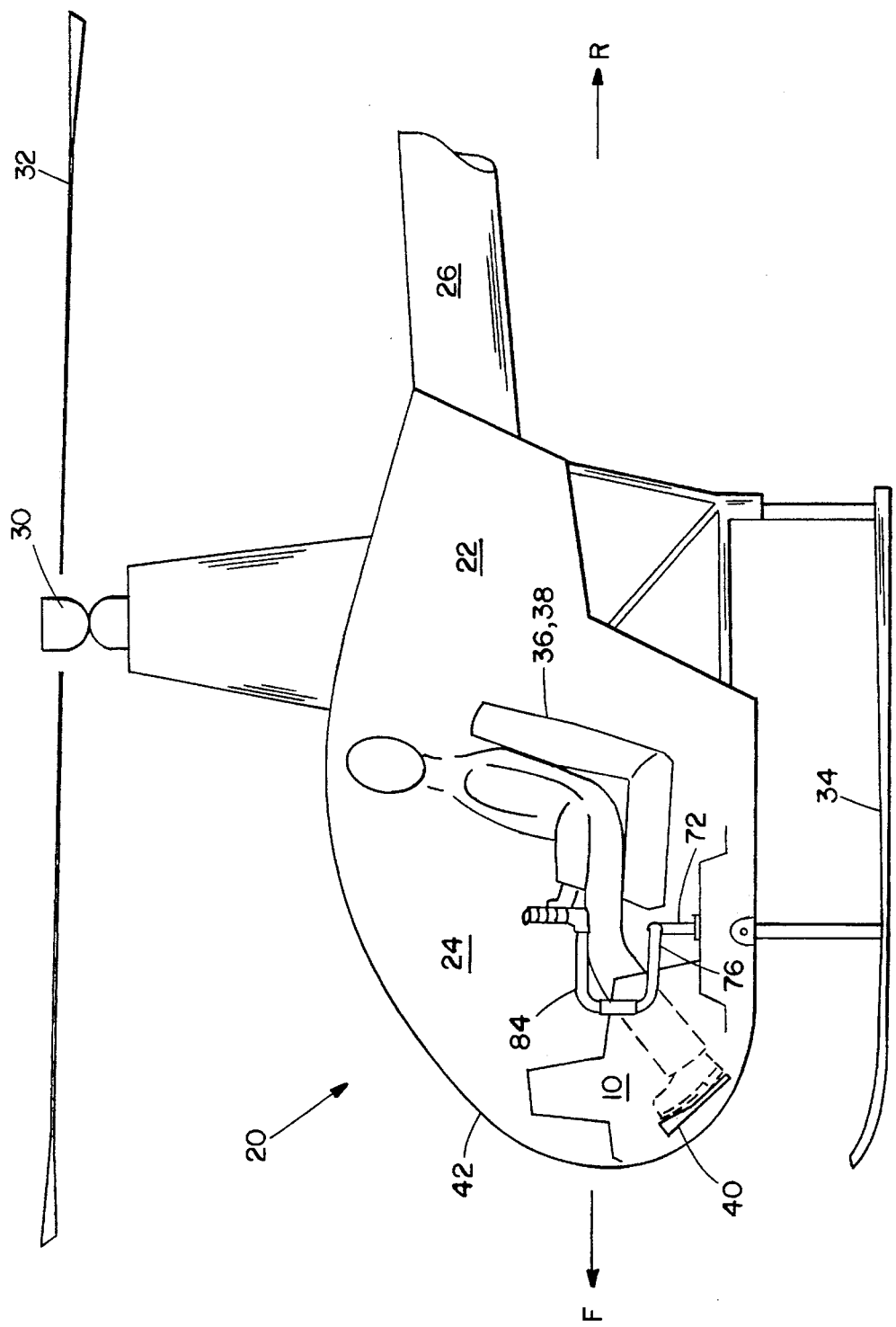
FIG. 5 is a side view thereof.
Figure 8:
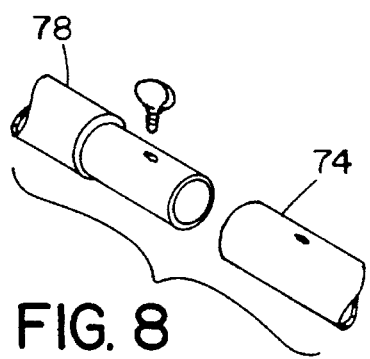
FIG. 8 is an exploded detail view of means for releasably securing one of the lower members to the crossbar.

FIGS. 3, 4 and 5 disclose a helicopter 20 having a fuselage 22 containing an engine, gear box, fuel tank, etc., located aft or rearwardly of the main cockpit, generally designated 24. The above-mentioned console 10 is located in the cockpit. A conventional tail boom 26, rotor masts 28, rotor hub 30, mounting a two blade rotor 32 will be seen. A tail rotor (not seen) is attached to the tail boom 26 in conventional manner. A conventional landing skid 34 supports the helicopter on the ground. A pair of seats 36, 38 are located in the cockpit, one each on each side of the central axis e. The cockpit is enclosed by a conventional bulbous windshield 42. Floor pedals 40 are located in the cockpit for conventional rudder control.

As representative of the prior art, FIG. 1 shows a control stick assembly similar to that disclosed in Robinson U.S. Pat. No. 4,114,843. The single, vertically oriented control stick 45 extends downwardly through an opening in the lower portion of the console 10, passing through an opening 46, and there joined to gimbal rings, journals, and the like (not shown), which, in turn, are connected to the aircraft controls such as the rudder, ailerons and the cyclic controls of the rotor. Reference may be had to the above-identified Robinson patent for such structure. At the upper end of the stick 45, a crossbar 50 is attached by way of a pivotal hinge 52. The crossbar tilts freely in a vertical plane in the directions of the arrows designated u and d. The stick does not rotate about its vertical axis. The crossbar portions 50, 52 each have attached to it hand grips 54, 56. In operation, the crossbar may be pivoted about the axis 53 of the hinge 53 to raise and/or lower the grips 54, 56. When one goes up, the other goes down. By pushing or pulling on the grips, the control stick is moved forwardly or rearwardly, moving of the aircraft control mechanism or surfaces accordingly. The stick 45 can be tilted left and right relative to the central axis e to further actuate the attached control linkage (not seen) best in the general area 47. An elastomeric boot 60 (shown in elevated position) may be positioned over the opening 46 to keep it clean.

One of the problems presented by the prior art apparatus is that the centrally located vertical stick 45 impairs access to the main instrument panel 12. Secondly, together with the crossbars 50, 52. The stick 45 blocks visibility of the instrument panel displays. Thirdly, when one grip 54 or 56 is moved up or down, the other automatically moves in the opposite direction. This often places the second grip out of convenient grasp for a pilot or copilot of differing as well as of same stature.

Referring next to FIGS. 2–5, Applicants control mechanism will now be described. As with the prior art, the mechanism is intended to effect lateral and longitudinal movement of the aircraft which has a forward end designated by the arrow F and a rearward end designated by the arrow R. A central axis e extends lengthwise of the aircraft. Portions of the control mechanism, generally designated 70, extend on both sides of this axis. A vertically extending short stub 72 has its lower end is engagable with the conventional aircraft control means of the type currently in usage and located below the cockpit floor or console. Applicants' dual control mechanism 70 may be installed directly in new aircraft or may be retrofit to existing aircraft by means hereinafter to be described. A crossbar 74 is secured to the upper end of the stub 72 and extends transversely on both sides of the central axis α near the floor. A pair of arcuate lower members 76 extend from the crossbar 74, one being located on each side of the axis of the aircraft. While they are shown integrally connected to the crossbar 74. The lower members 76 may be made separately and joined as, for example, at the elbows 78 or elsewhere as will be described hereinafter. The lower members 76 extend toward the forward end F of the aircraft and lie in a plane substantially parallel with the axis e. The lower members then curve upwardly at 80 and terminate in distal ends 82.

A positioning arm 84 is secured to the distal end of each lower member 76. The positioning arms extend toward the rearward end R of the aircraft. A hand grip 86 is secured to each positioning arm.

Figure 9:
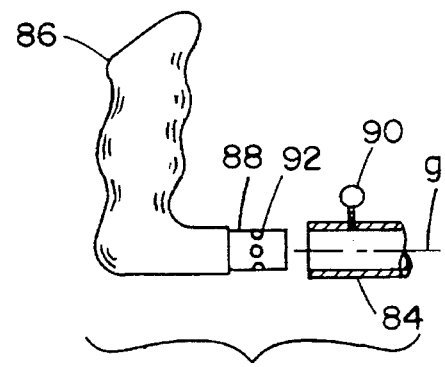
FIG. 9 is an exploded detail view of means for pivotally mounting the grip on the positioning arm.

As will be seen in FIG. 9, means are provided for adjustably securing the grip 86 to the arm 84. It includes a circular extension 88 extending from the grip which is rotatably received within the arm 84 for adjustment about the axis g. A thumb screw 90, set screw or other equivalent means is threaded into the arm 84 and may be received in one of a plurality of recesses 92 in the extension 88 of the grip. When the screw is backed off, the grip is free to be rotated into any other desired position about the axis g.

Figure 6:
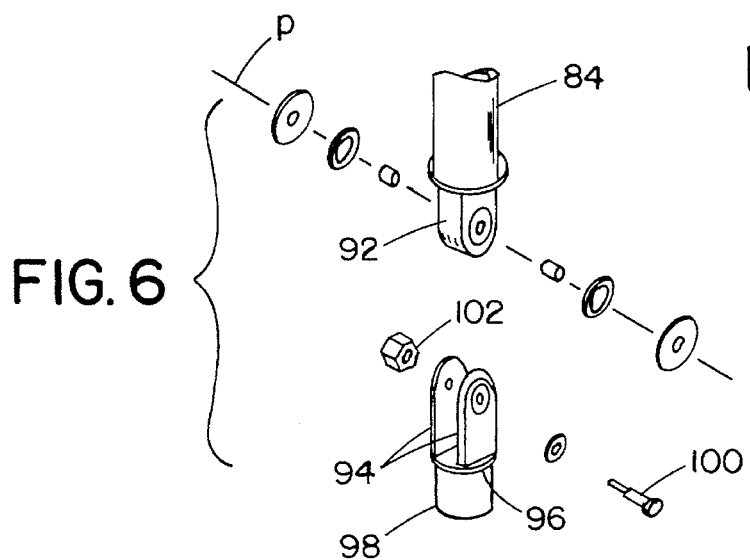
FIG. 6 is an exploded detail view of a pivot mechanism for adjustably joining the positioning arms to the lower members.

Referring next to FIG. 6, each of the means 82 for pivotally mounting the positioning arms 84 on the lower members 76 comprises a downwardly extending arcuate projection or hinge member 92 which fits between the upwardly extending ears 94 of a mating hinge 96 which, in turn, extends upwardly from a stub 98 which is received and fixed in the lower member 76. A pin 100 passes through appropriate washers (not designated) and is secured by a nut 102 in any desired position of adjustment.

By backing off the nut 102, each arm 84 may be held loosely relative to the member 76 such that when it is not in use, it may be allowed to hang in a lowered position closer to the floor permitting better access to the passenger seats.

In like manner, the best access is by raising the arm to vertical. By this construction, either of the arms 84 may be independently adjusted heightwise by the pilot or copilot independently of the heightwise location of the other arm. Alternately, by tightening the nut 102, the upper arm may be fixed in a selected height position according to the pilot's preference. If the nut 102 were replaced with a manual clamp, such friction adjustment could be selected by the individual pilot.

Likewise, the grips 86 themselves may be adjusted about the axis g to a desired angular orientation. When assembled, the pivot mechanisms may be covered by boots 101 for cosmetic purposes.

Figure 7:
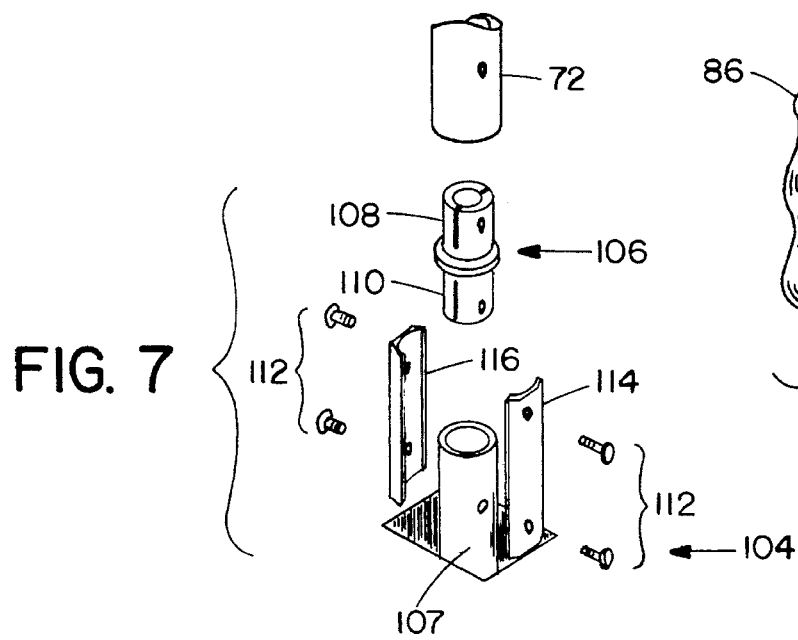
FIG. 7 is an exploded detail view of mechanism for securing the stub to the aircraft control means.

Referring next to FIG. 7, mechanism generally designated 104 will be seen for securing the stub to the aircraft control mechanism below the console. If, for example, it is desirable to retrofit existing aircraft with Applicants' new dual control mechanism, it may be done so simply. The stub 72 is secured to an upwardly extending plug 106 which is an internal double cylindrical member which fits respectively within the stub 72 and a tubular member 107 secured to the controls beneath the floor. The member 107 may be the original stick 45 cut off. The mechanism is locked together by screws 112 passing through arcuate, apertured plates 114, 116. When not a retrofit, the upper portion of the plug 106 is welded to the crossbar 74.

Figure 2:
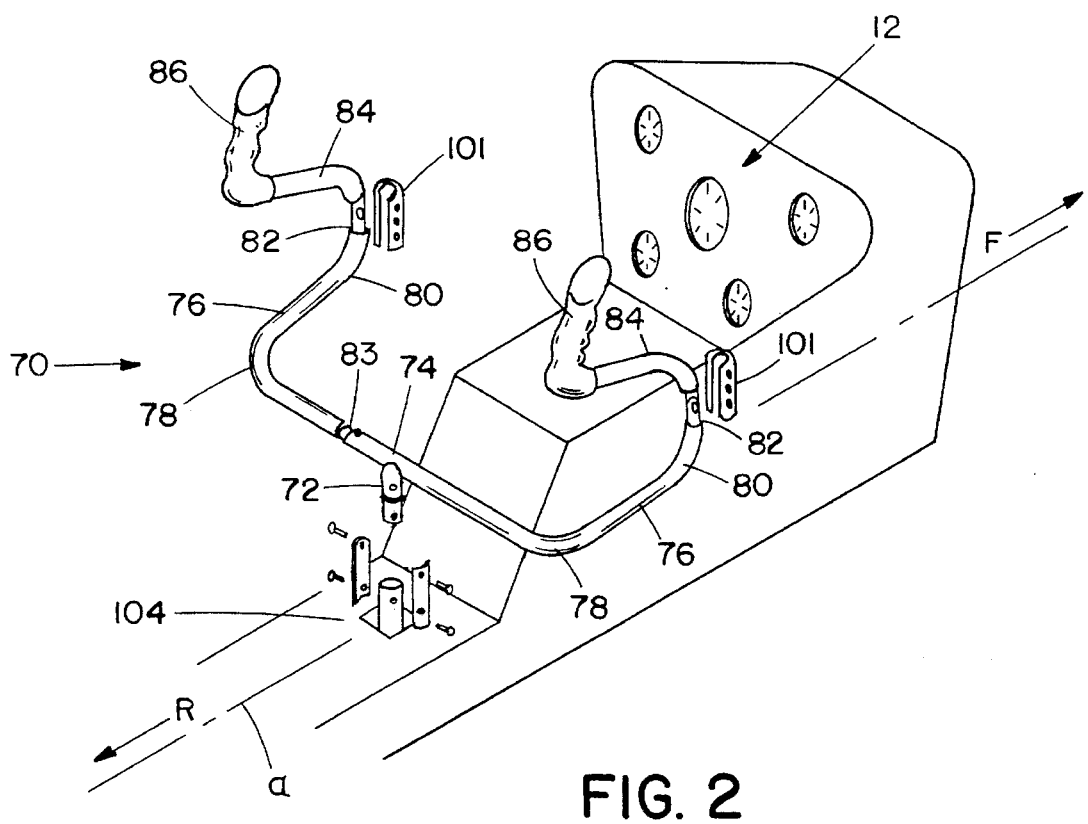
FIG. 2 is a perspective view similar to FIG. 1 showing a dual control mechanism made in accordance with the present invention.

As will be seen in FIG. 2, the lower arms 76 may be separated from one another and removed for cleaning the aircraft or other purposes by connecting means similar to that shown in FIG. 9 for securing the grip to its arm 84. Although only one of the lower arcuate members 76 is shown to be removable, the other may be removed as well.

Figure 10:
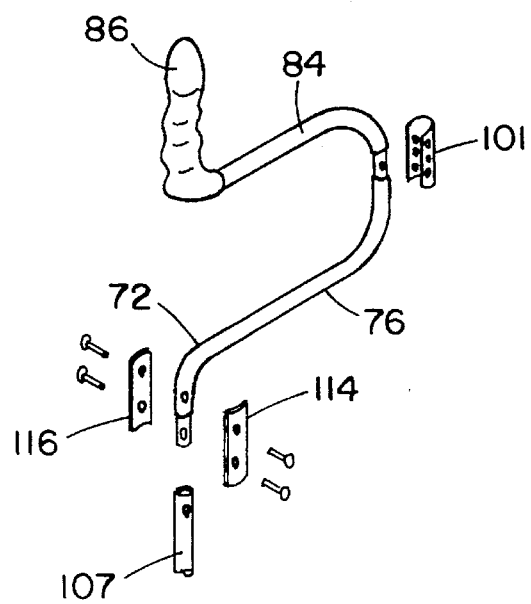
FIG. 10 is a view similar to FIG. 2 but showing a single control mechanism made in accordance with the present invention.

Referring next to FIG. 10, the upper positioning arm 84 and the lower arcuate member 76 may be attached by the retrofit mechanism to a single stick which is centered relative to a pilot. The mechanism is the same as that described with reference to FIG. 7. The advantage of a hinged positioning arm 84 is that it allows better access (both ingress and egress) and comfort to the passenger. It enables planar motion of the hand grip throughout the arc travel of the stick. It also allows full clearance of the grip with regard to the legs at the extreme range of motion of the stick. In most helicopters, the stick comes close to, or sometimes physically engages, the knees of the pilot at the limit of travel. The same is true of the single sticks used in fixed wing aircraft.

Figure 11:
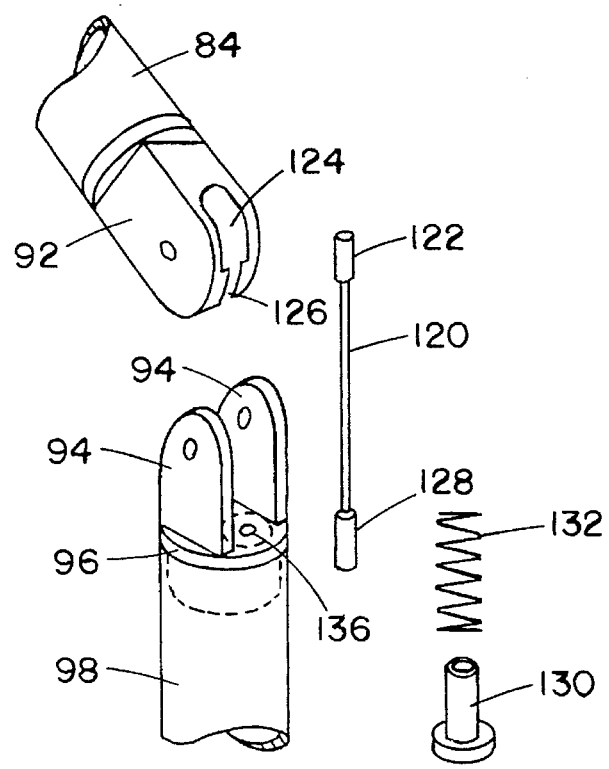
FIG. 11 is an exploded detail view of a counterbalance mechanism for the pivoted arm.

Referring next to FIG. 11, a mechanism will be described for counterbalancing the weight of the positioning arm 84. FIG. 11 shows some of the mechanism described with reference to FIG. 6. It includes the positioning arm 84, the hinge member 92 which cooperates with the ears 94 of the mating hinge 96, to produce the hinge joint between the upper positioning arm 84 and the lower arcuate member 76. A cable 120 has an enlarged upper cylindrical end 122 which is engagable in a cable retainer slot 124 having a lower milled groove 126 against the rear of which the enlarged end 122 is secured. The cable passes downwardly through a bore 136 in the plate 134 which supports the upstanding ears 94. A coiled compression spring 132 surrounds the cable and abuts the lower face of the plate 34 beneath the bore 136. The lower enlarged end 128 of the cable 120 fits within a cable retainer 130 such that the spring 132 is in compression between the retainer 130 and the lower face of the plate 134 thus placing the cable 120 in tension tending to pivot the upper control arm upwardly or in a clockwise direction as viewed in FIG. 5.

Other forms of counterbalancing may be employed as, for example, a rotary spring or similar force-resisting elements to cause the upper arm to balance at any height wise position regardless of the selected friction in the hinge. Depending upon the force of the spring selected, the arm could, for example, always return to the uppermost position or remain in any desired position depending upon the friction of the hinge.

Figure 12A:
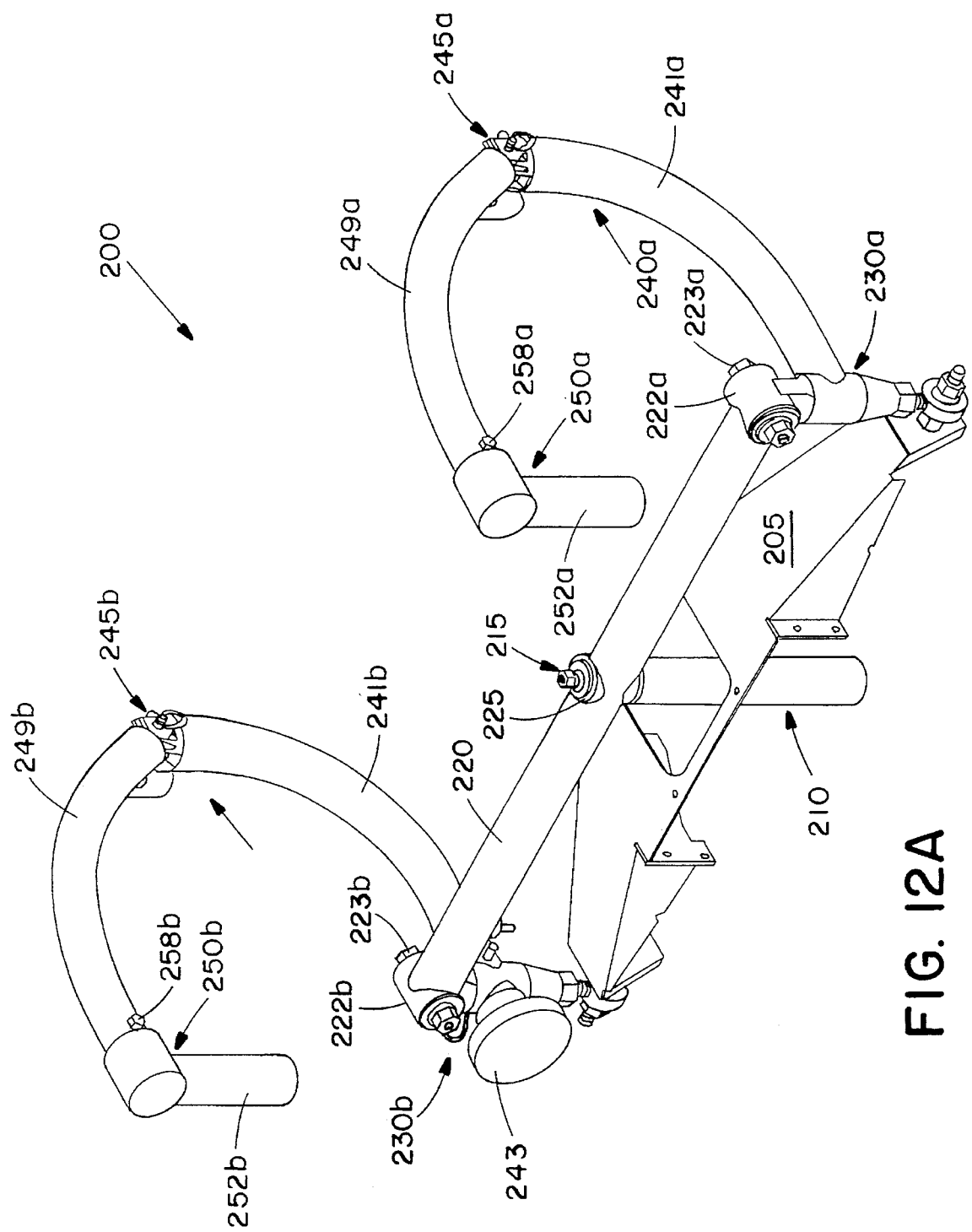

FIGS. 12A–12B are schematic diagrams illustrating preferred embodiments of an inertially dampened split cyclic control. The bearings used in the system provide viscors damping. The cyclic control 200 provides identical control motion of conventional cyclics but uses a 4-bar mechanical system that eliminates essentially all torsional and axial loads on the cyclic system 200 being transferred to a pivot arm 210 while adding inertial dampening to reduce stick shake. A preferred embodiment also improves system balance with or without an auxiliary control in place and allows for easy removal of this central (i.e. passenger side) 240b. The hand grips 250 have been modified to improve the ergonomics and feel of the control.

The cyclic assembly 200 is mounted to a control stick or pivot arm 210, which can be coupled to a conventional aircraft control mechanism (not shown) or other suitable control linkage. A crossbar or transverse member 220 is fastened to a center post 215 on the control stick 210 via a sleeve 225 of the crossbar. At each end of the crossbar 220 is a respective coupling 222a, 222b, which is fastened to a respective pivoting bearing assembly 230a, 230b, by respective fasteners 223a, 223b. The bearing assemblies or elements 230a, 230b are in turn coupled to a rigid bracket 205.

Control tubes or arms are 240a, 240b also coupled to the respective bearing assemblies 230a, 230b to inertially dampen the control tubes 240a, 240b through the bracket or frame 205. As illustrated in FIG. 12A, the control tubes 240a, 240b are pivoted by a joint 245a, 245b, which separates a lower tube 241a, 241b from an upper tube 249a, 249b. The lower tubes 241a, 241b are coupled to the bearing assemblies 230a, 230b and the upper tubes 249a, 249b are coupled to hand grips 250a, 250b. As illustrated, the left cyclic 240b is an removable cyclic that is secured to the left (i.e. adapting) bearing assembly by a thumbscrew 243.

In FIG. 12A, the rigid bracket 205 is a one-piece member. In FIG. 12b, the rigid bracket 205' is a two-piece member 205a, 205b. The two-piece bracket 205' adapts better to dimensional variations between helicopter consoles and facilitates access to the aircraft control gimbals through pivot arm 210 without the need for a material modification of the aircraft or its control system.

Figure 12C:
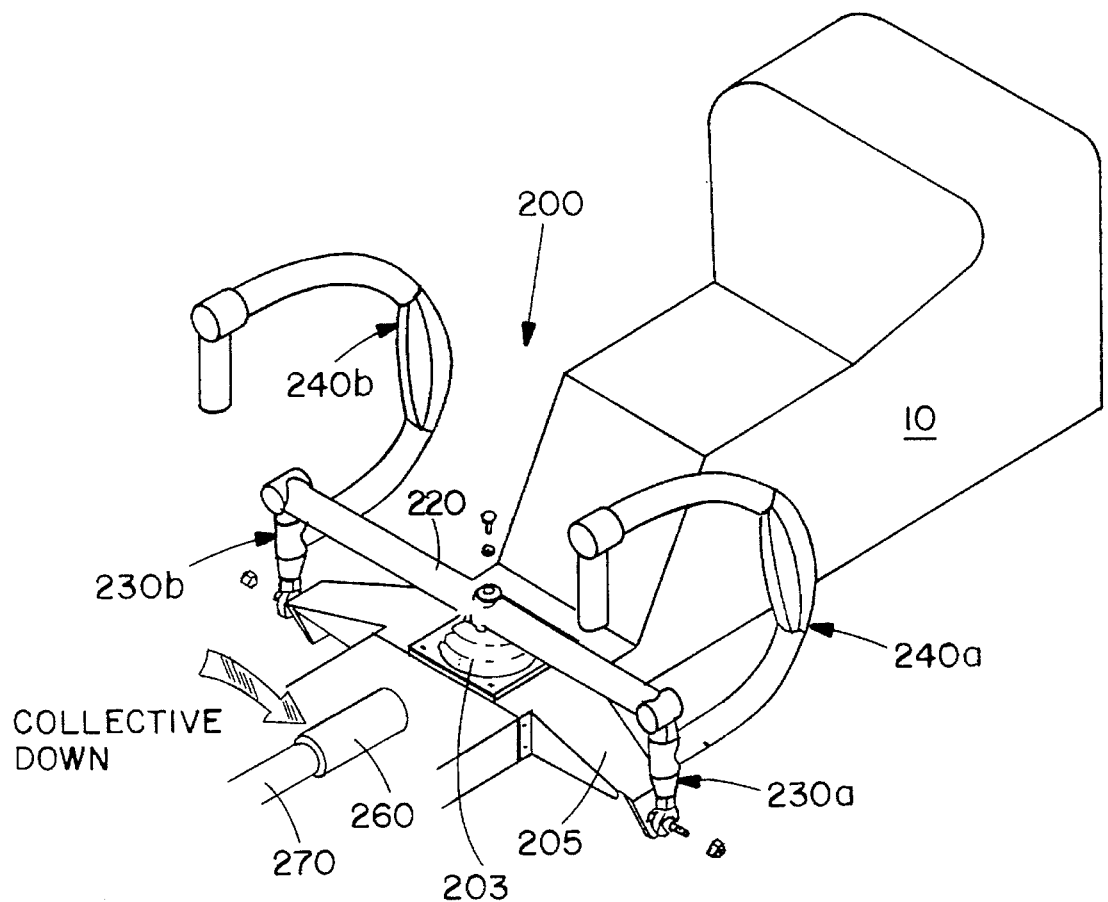
FIG. 12C is a schematic diagram of the cyclic control 200 mounted to the console.

FIG. 12C is a schematic diagram of the cyclic control 200 mounted to the console 10. Note that a boot 203 encases the control stick 210 and is disposed between the crossbar 220 and the bracket 205. Also illustrated is a collective lever 270 in the down position. A collective control grip 260 is illustrated on the collective lever 270.

Figure 13:
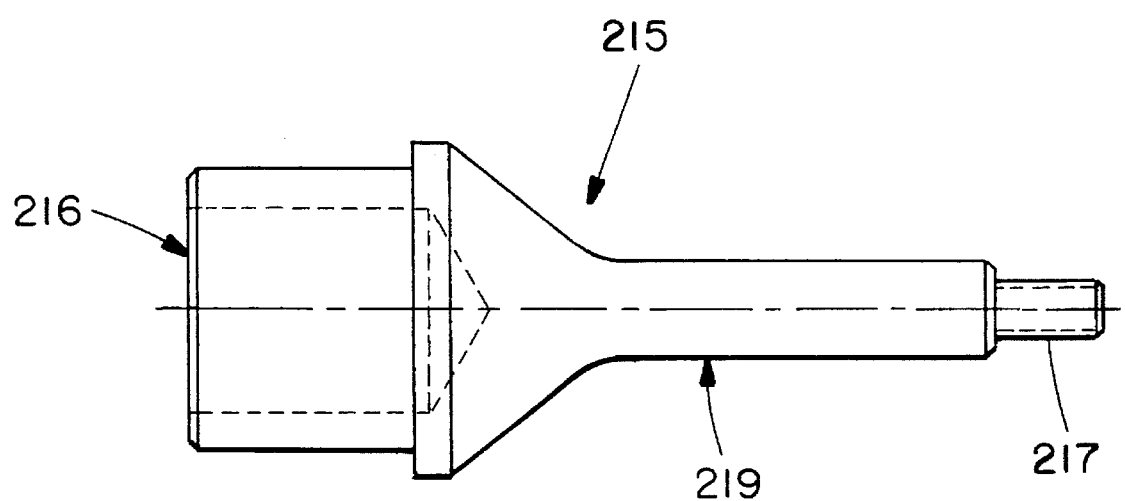
FIG. 13 is a schematic diagram illustrating a preferred embodiment of a center post.

FIG. 13 is a schematic diagram illustrating a preferred embodiment of a center post 215. The center post 215 mates at 216 with the control stick 210. The crossbar 220 fits over and slides about a central axis 219. The crossbar 220 is captured to the center post 215 by a threaded bolt 217. Other suitable center posts can be substituted.

Figure 14A:
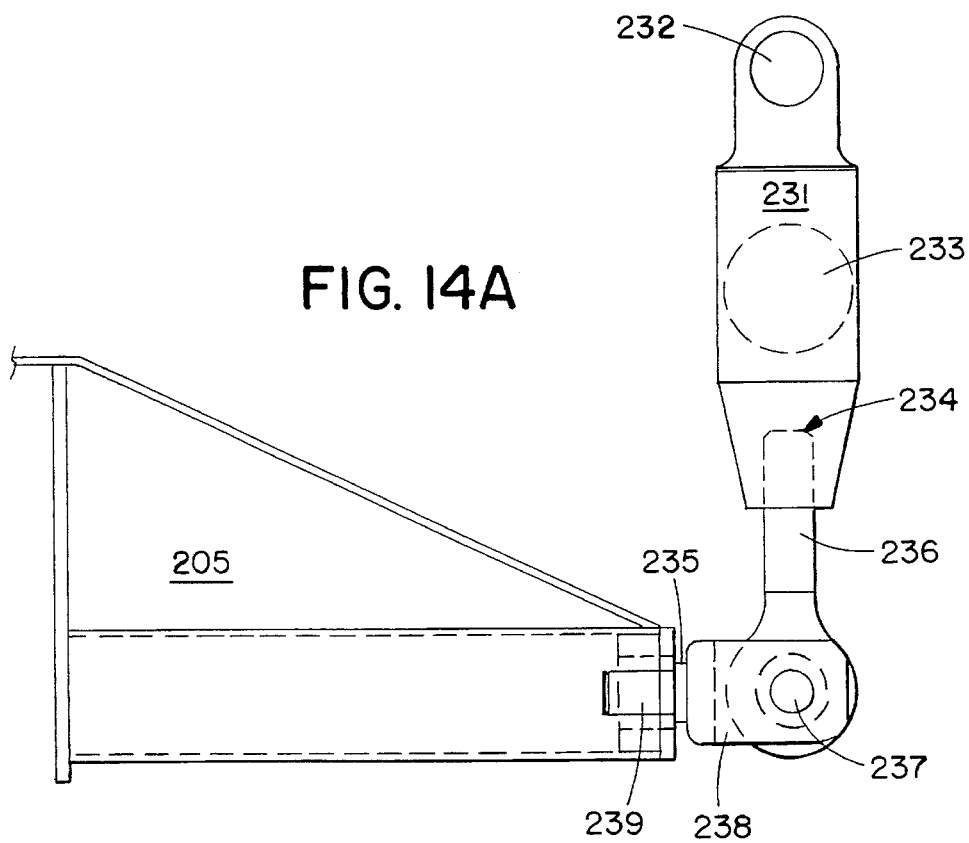
FIGS. 14A–14B are schematic diagrams of a particular preferred embodiment of a bearing assembly.
Figure 14B:
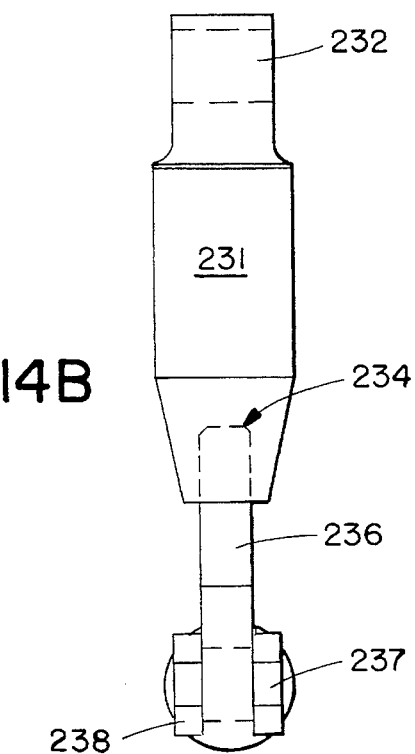

FIGS. 14A–14B are schematic diagrams of a particular preferred embodiment of a bearing assembly 230. In a preferred embodiment, the bearing assembly 230 is coupled to the lower bracket 205 via a knuckle or bearing joint formed by outer coupling 238 and pin joint 236. The outer joint 238 is fastened to the lower bracket 205 by a bearing 239 and washer 235. In a particular preferred embodiment, the bearing 239 is a bronze and teflon bearing. The outer joint 238 is coupled to the pin joint 236 via a pin (not shown) through aligned apertures 237. The pin joint 236 is within a cavity 234 of the post 231. Thus the bearing joint provides rotation of the bearing elements in two directions relative to frame 205.

The end post 231 includes a cavity 233 (shown in phantom) to receive the control tube 240. The end post 231 mounts to a respective crossbar mount 222 through aperture 232. The end post can be secured directly to a standard fixed control tube 240a or the end post can be adapted to receive a removable control tube 240b.

Figure 15:
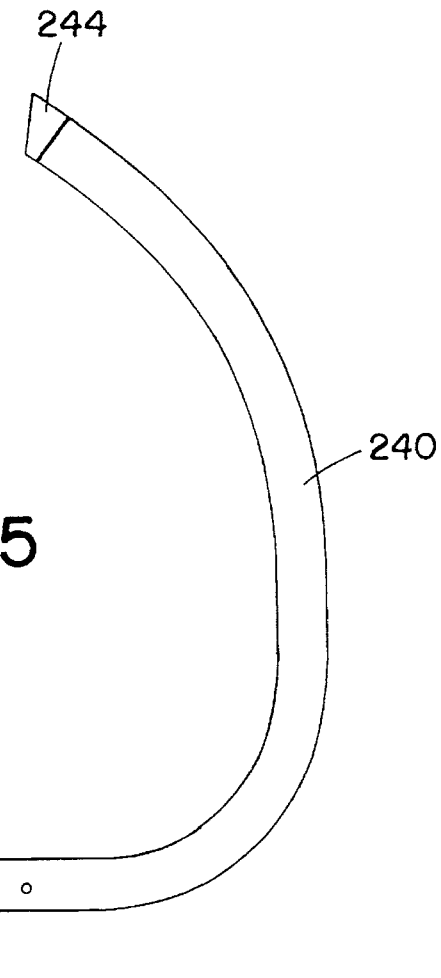
FIG. 15 is a schematic diagram illustrating a fixed control tube mounted to a respective end post.
Figure 16:
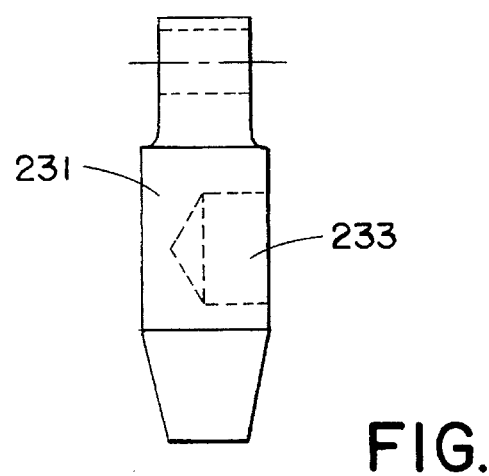
FIG. 16 is a schematic diagram illustrating the fixed end post 231a of FIG. 15.

FIG. 15 is a schematic diagram illustrating a fixed control tube 240a mounted to a respective end post 231a. Although the control tube 240a is shown as a single (unjointed) control tube, it is understood that the control tube 240 can be segmented into segments 241, 249 separated by a joint 245 as illustrated in FIG. 12A. The control tube 240 includes a flange 244 for mounting to a hand grip 250. FIG. 16 is a schematic diagram illustrating the end post 231a of FIG. 15.

Figure 17:
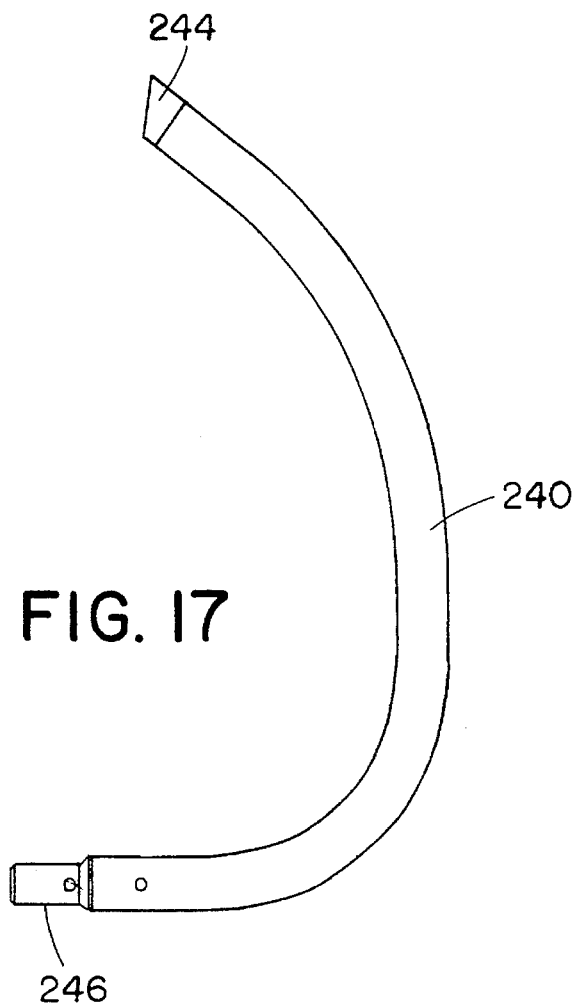
FIG. 17 is a schematic diagram illustrating a removable control tube.
Figure 18:
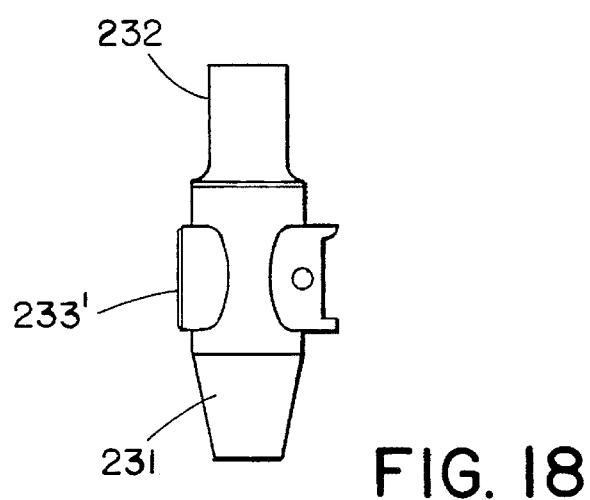
FIG. 18 is a schematic diagram illustrating an end post adapted to the removable control tube 240b of FIG. 17.

FIG. 17 is a schematic diagram illustrating the control tube 240b. The removable control tube 240b includes a pin joint 246 for coupling to an adapting end post 231b. As illustrated in the schematic diagram of FIG. 18, the adapting end post 231b includes an aperture 233b therethrough, to which the pin 246 of the control tube 240' extends to mate with the thumbscrew 243.

Figure 19:
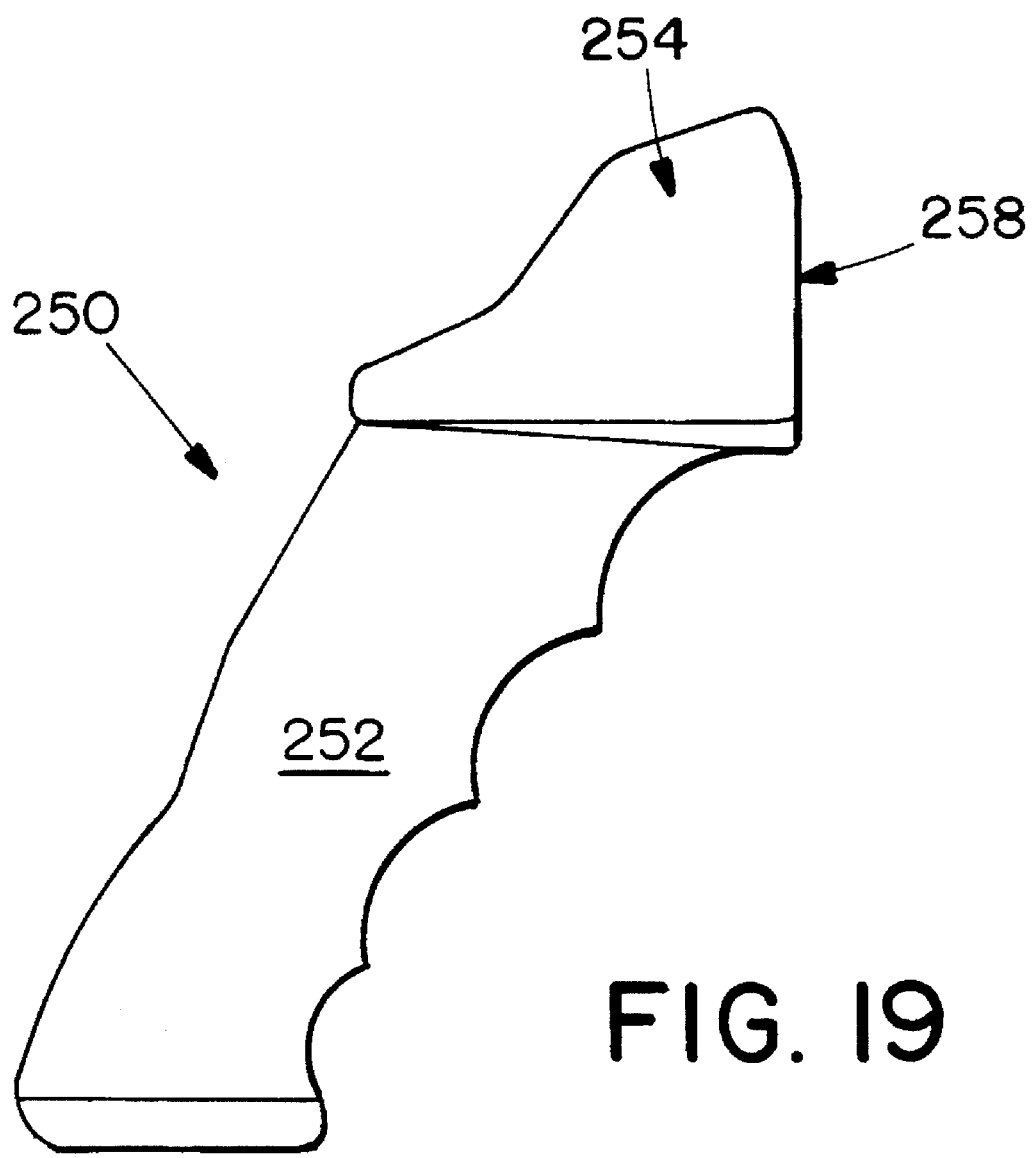
FIG. 19 illustrates a particular preferred embodiment of a hand grip assembly.

FIG. 19 illustrates a particular preferred embodiment of a hand grip assembly 250. The hand grip 250 includes a grip 252 and a receptacle 254 adapted to mount to the flange 244 of a control tube 240. The hand grip assembly 250 is secured to the control 240 by bolting through apertures 258.

Figure 20A:
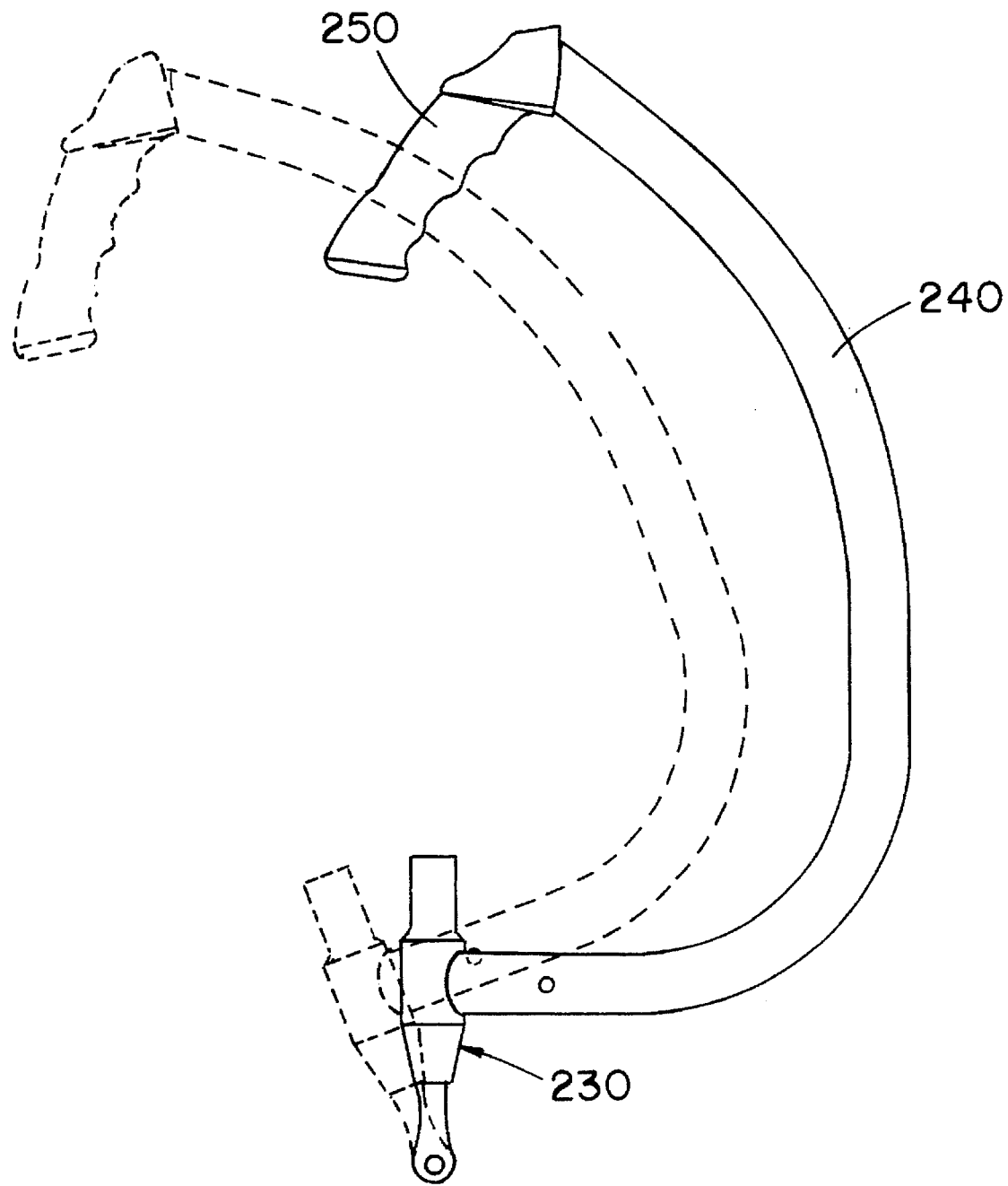
FIG. 20A is a schematic diagram illustrating the central tube 240 and bearing assembly 230 undergoing fore and aft motion.

FIG. 20A is a schematic diagram illustrating the central tube 240 and bearing assembly 230 undergoing fore and aft motion. FIG. 20B is a schematic diagram illustrating the central tube 240 and bearing assembly 230 undergoing lateral motion. An alternative embodiment mounts the crossbar underneath the aircraft where the pivot arm extends below the joint, and is retrofitted on the belly under the floor. A cover is then placed over the exterior mounted components.

FIG. 21 is a exploded schematic diagram of a collective control point assembly for mounting to an existing collective control lever 270 by mount 267. The collective control point assembly 260 places switches 261 at the end of a collective grip 262 to be within easy reach of the pilot's thumb. The switches 261 are disposed within a large cavity 263 covered by an end plate 264 to facilitate adding additional switches (not shown). The grip 262 is encased within a padded leather cover 265.

Aircraft maintenance and inspection requirements are a key to flight safety and lowering operating cost. For example, helicopter flight operations that exceed the maximum RPM for the engine or rotor can create a potentially dangerous situation. Manufactures recommend that various inspections be performed whenever the acceptable limits are exceeded. Depending on the particular flight situation, the pilot may not even be aware an over speed has occurred.

A preferred Health and Usage Monitoring System (HUMS) monitors and reports critical engine speed, engine temperature, main rotor speed beyond safe limits. FIG. 22 is a schematic block diagram illustrating the functionality of a preferred embodiment of a HUMS 400. Events outside the known safe limits are captured and optionally reported by the HUMS computer 410, allowing a review in a post-flight inspection. In a particular embodiment, data can be reviewed on a backlit liquid crystal display (LCD) 451 or off-loaded to a printer 452 or an external computer creation of a permanent record. After the recording of an event over safe limits, the computer 410 illuminates an instrument panel display the next time the aircraft master switch is cycled on.

The HUMS provides several ancillary uses in normal operation, the helicopter rotor and engine speeds, expressed in percentage of normal operating value, track within a few percent. If the engine speed drops below rotor speed, this is likely indication of an auto-rotation. This event may be proscribed by contractual arrangement between a helicopter owner and operator. Therefore identifying this event is of value and continuous monitoring provides for recording of special events, such as auto-rotation and low rotor speed.

The HUMS can also be used as a training aid for developing execution skill for an auto-rotation. On determining the occurrence of an auto-rotation event by relative engine and rotor speeds, the HUMS enters data logging mode, where these speeds are streamed to memory. This data, in numeric or graphical form, may be down-loaded to an external computer or printer and compared to optimal speed profiles for evaluation.

If rotor speed drops below engine speed, this is possible indication of a transmission failure. The HUMS can act as a flight recorder in capturing events related to this occurrence. Appropriate response of the pilot in reestablishing appropriate rotor speed can be monitored.

Added functionality can be achieved by incorporating other external information. An altimeter 421 can be used to distinguish between allowed practice events on ground and prohibited events in flight. An accelerometer 425 can be used for signature analysis to identify stressed components on the verge of failure. Additionally, a power monitor for a HOBS can be used to identify possible tampering or replacement of the HOBS meter.

The HUMS comprises an instrument panel mounted indicator 453, the computer 410, display 451 and remote sensors 420. In a preferred embodiment the HUMS 400 further includes a display 451 user input buttons 440. In another preferred embodiment, the HUMS includes a communications facility but not a display 451 and buttons 440.

Helicopter status is monitored by a monitor 410. The monitor 410 receives inputs from sensors 420. The sensors 420 includes, but are not limited to, low level altimeters 421, engine temperatures sensors 422, engine speed sensors 423, rotor speed sensors 424, and accelerometer 425. The monitor 410 also continuously receives input from a clock 430, which provides the ability to time-stamp events and measure duration of events. Control panel inputs 440 include, but are not limited to, a supervisor key switch 441, a mode button 443, a function button 444, an up/enter button 445, and a down button 446. The monitor 410 provides user messages to a display 451, and episode reports to a printer 452 or external computer. Optionally, a monitor 410 can provide real time warnings to the pilot via a yellow LED 454 to indicate warning conditions and a red LED 454' to indicate danger conditions. In a particular preferred embodiment, a single indicator 453 is used to notify a user that a potentially hazardous event had occurred during a prior flight.

Flight operations close to the ground are often the most critical concerning flight safety. The low level altimeter 421 provides short range information to the pilot. In addition to providing explicit altitude in low level operations, the low level altimeter 421 helps to develop perception in a hover or a flare, which can enhance instructor and student communication and understanding as well as verifying height at night, over water and in areas of low obstruction such as runway light. The low level altimeter 421 uses an acoustic ranging technology without radio frequency emissions or audible signal. The altimeter 421 has an ultrasonic transducer assembly that can be configured to operate in ranges from 0–30 ft. or 0–60 ft. This acoustic range overlaps with most radar altimeter systems that provide a typical useful range beginning at 20–50 ft. above ground level. The altimeter 421 preferably has an accuracy of about 0.2 ft. and a display resolution of 0.2 ft. increments from 0–5 ft. and 1 ft. increments above 5 ft.

As with all above ground level altimeters, altitude range is depended on ground reflectivity. Tarmac and water are excellent reflectors of acoustic energy. Porus and irregular surfaces may dissipate and diffuse transmitted energy and reduce usable range. When an altitude signal is not sufficient to accurately measure the altitude, the pilot is informed.

The engine temperature sensor is preferably a "J" type thermocouple with ring-mounted pickup at the cylinder head. In an preferred embodiment, the measurement range is from 32° F. to 800° F., with an accuracy of ±10° F.

A preferred embodiment of the engine speed sensor 423 includes a Hall-effect pickup from the magneto of the engine. The sensor preferably provides an accuracy of ±1 RPM.

The main rotor speed sensor preferably includes a Hall-effect pickup off the main gear box coupling to provide an accuracy of ±1 RPM.

The monitor 410 stores flight and event data. A flight number, flight date and flight time are stored for up to one hundred flights. Event data includes an event number, the event time, the event duration, the event type, and the maximum value observed, for up to five hundred events.

A preferred embodiment of the HUMS 400 has several features designed to make the system tamper proof. If a sensor becomes disconnected or the input become otherwise invalid, this is detected by the system microprocessor and recorded in memory. Should power be moved from the system 400, this event is captured and the time of event is recorded. The HUMS 400 can also detect operation of the helicopter without bus power.

Figure 23:
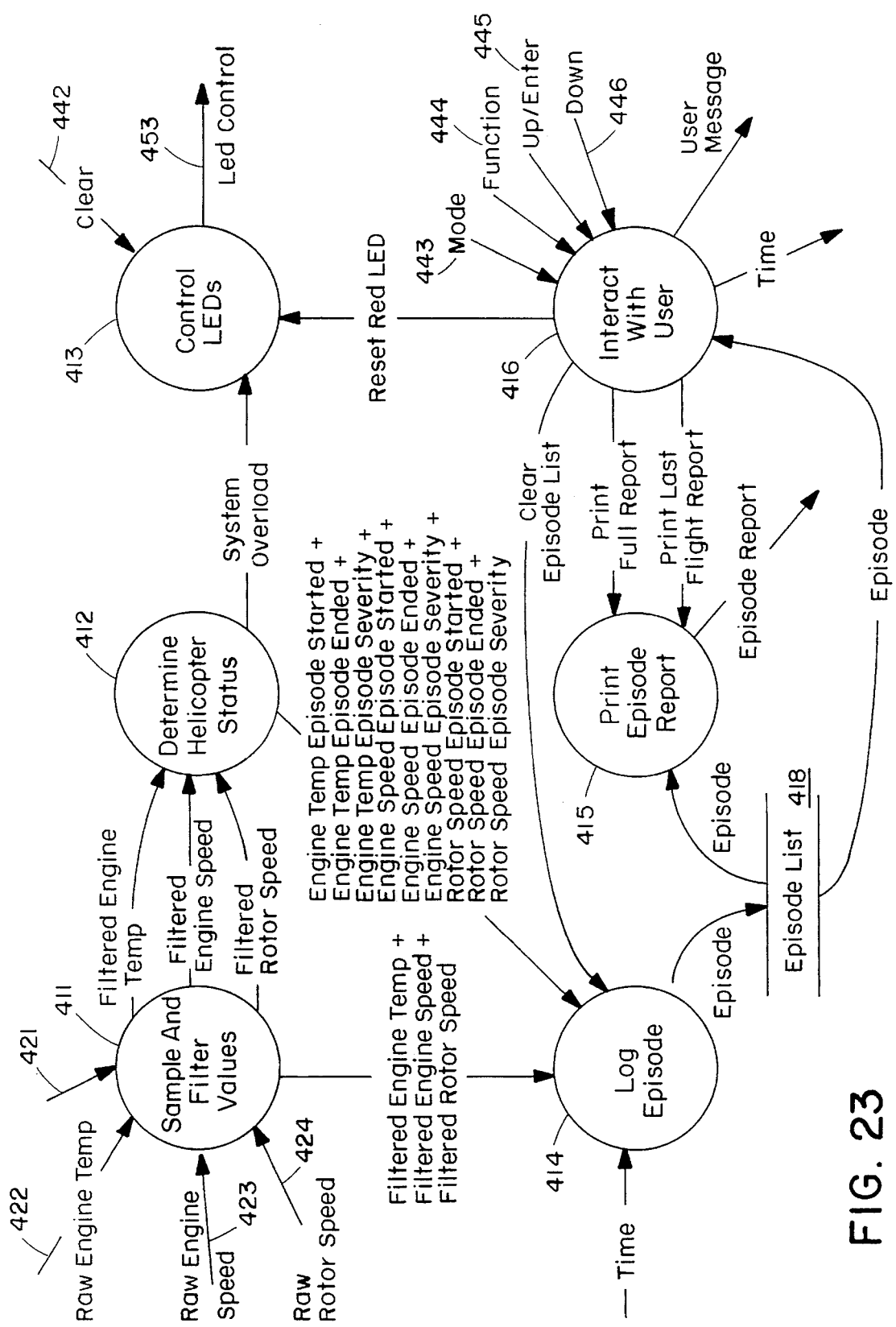
FIG. 23 is a process flow diagram of the monitor module 410 of FIG. 22.

FIG. 23 is a process flow diagram of the monitor 410 of FIG. 22. The sensor inputs are sampled and filtered at filter 411. The filter 411 samples the sensor inputs at a preferable rate of 8 Hz. The raw sensors input values are converted to scaled fixed point values and then filtered. The filter averages the last eight scaled sensors values and outputs filtered sensors values at a rate of 1 Hz. to a status comparator 412 and a log module 414.

The status comparator 412 compares the filtered sensor readings to predetermined thresholds. Two sets of limits are defined for each input, a lower limit serves as a precautionary warning, and a higher limit serves as a hazard warning. If any filtered sensor value exceeds on of the thresholds, the event is logged to the log module 414. Exceeding any of the higher thresholds results in a potentially hazardous flight condition and an overload signal is sent to a lamp control 413. After completion of an event over a threshold, the status comparator 412 outputs, for each filtered sensor value over the threshold, the episode, end time, and severity to the log module 414.

The lamp control 413 receives the system overload signal from the status comparator 412. Receipt of a system overload causes the lamp control 413 to light the indicator lamp 453 after the power is again cycled on. Once activated, the lamp 453 remains on until cleared with the use of a key switch 441. The lamp 453 can only be reset via the reset red signal from the user interface module 416. Optionally, if a system warning is received, the lamp control 413 lights the yellow lamp 454, which can be cleared by depressing the clear button 442 and the red lamp 454', which can only be cleared via the key switch 441.

The log module 414 receives time input from the clock 430, the filtered sensor values from the filter 411, and the episode data from the status comparator 412. The log module 414 maintains a list of episodes 418. Information for each episode includes the type of episode, the severity of episode, the time started, the duration, and maximum of filtered parameters during the episode. The log module 414 guarantees that if a power-down occurs during the logging of an episode, though that episode may be lost, the episode list 418 is left in a recoverable state. The episode list 418 is cleared when a "clear episode list" signal is received from the user interface 416. In addition, a start flight entry is added to the episode list when the system is powered up to time stamp the start of a flight. As previously described, the log module 414 can store up to 500 different episodes and start of flight entries. If the storage limit is reached, the next episode causes the episode from the earliest flight to be erased to provide space for current entries. The log module 414 outputs episodes to the episode list 418, which can be either printed by a print module 415 or viewed through the user interface 416.

The print module 415 receives episodes from the episode list 418, "print full report" commands and "print last flight" commands from the user interface 416. The print module 415 prints a formatted report of episodes from the list of episodes 418. Upon receipt of a "print full report" command, a full report containing data from all flights is printed. Upon receipt of a "print last flight report" command, a last flight report containing data from only the last flight is printed.

The user interface 416 receives user commands through the mode button 443, the function button 444, the up/enter button 445, and the down button 446. The mode button 443 cycles through four modes which are time, episode, clear, and print. Every time the mode key 443 is depressed the mode advances and is displayed on the display 451. Each mode has a collection of functions that the user can execute. In particular, the time mode has a year, month, day, hour, and minute function; the episode mode has a flight and an episode function; the clear mode has a clear lamp and a clear episode list function; and the print mode has a print last and print full function. The function button 444 cycles to the next function and the current mode and displays that function on the display 451 together with the current mode.

Successive time mode functions the display elements of the current time (time, month, day hours, minutes) and the up button 445 and the down button 446 can increase or decrease the current reading. The displayed time element is automatically entered into the clock when another function or mode is selected. During the episode mode, the flight function displays the currently selected flight number and the flight start time. The up button 445 and the down button 446 can increase or decrease a flight number to scroll through recorded flights. The episode function displays the currently selected episode number and flight number and the associated data. The up button 445 and the down button 446 can increase and decrease the episode number. The data is displayed automatically when this function is selected or when the episode is changed. The operation of the clear and print modes have previously been described. In either the clear or print modes, the enter button 445 is used to invoke the function.

Figure 24:
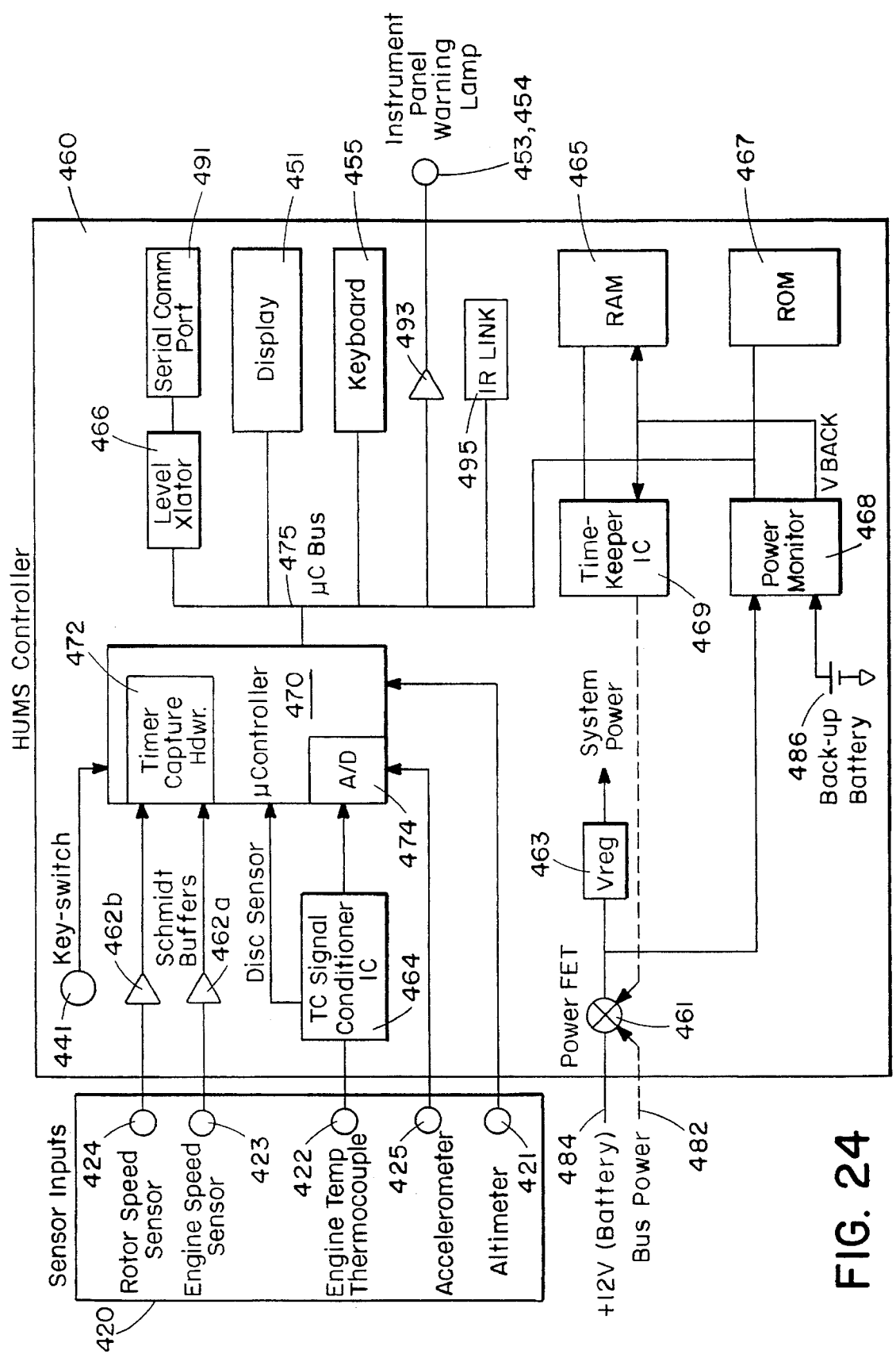
FIG. 24 is a schematic block diagram of a preferred embodiment of a HUMS controller according to the invention.

FIG. 24 is a schematic block diagram of a preferred embodiment of a HUMS controller according to the invention. In a preferred embodiment of the invention, the monitor 410 is a software program executed in a microcontroller 470 of the HUMS controller 460. A microcontroller 470 also has an analog-to-digital subsystem 474 to convert analog signals representing temperatures, such as from the engine temperature sensor 422, and accelerations, such as from the accelerometer 425, into digital signals. A microcontroller 470 also includes a timer/capture subsystem 472 whereby signal edges at these inputs are time-stamped, and time value differences between successive edges are used to calculate rotor and engine speeds from the rotor speed sensor 424 and the engine speed sensor 423, respectively. The timer/capture subsystem 472 receives a square-wave output from Schmidt buffer 462, which provides noise rejection through hysteresis on the signals from the Hall-effect sensors 423, 424.

The HUMS controller 460 is tied directly to the helicopter battery 484. External power to the electronic system is gated by a power FET 461. The power FET 461 is turned on by either turning on the external helicopter bus power switch 481 or by a control output from an internal time keeping circuit 469. A voltage regulator 463 converts the battery level voltage to a nominal 5 volt output to power the system electronics.

A power monitor circuit 468 assures continuous power to the time keeping circuit 469 and to event memory 465. The power monitor 468 can provide power to these devices from either normal system power from the helicopter battery 484, or from a backup battery 486, such as a lithium battery. The power monitor 468 senses the voltage after the power FET 461. If the voltage drops below a threshold, the power monitor 468 switches power to the backed up devices, such as random access memory (RAM) 465 and the time keeper 468, from normal power 484 to battery power 486.

There are two types of memory in the controller 460, the RAM 465 and read only memory (ROM) 467. The RAM 465 stores logged events and is also used by the microcontroller 470 for execution of logical programs. The ROM 467 contains the logical program executed by the microcontroller 470.

The time/date clock 430 is contained within the time keeper circuit 469. The time and date are provided as a stamp for events logged in memory. The time keeper circuit 469 also provides a control output which turns on power to the full electronic system 460 bringing the system to full operation.

The microcontroller 470 is connected to a microcontroller bus 475, which is also connected to a level translator 466 to provide from logic signals, RS-232 interconnect voltage levels to a serial communication port 491 from logic level signals. The display 451 and a keyboard 455 are also connected to the microcontroller bus 475. The instrument panel warning lamp 453, is connected to the microcontroller bus 475 drive through a driver circuit 493, which converts the logic-level signal to a current-sinking output signal for driving the lamp 453. An infrared link 495 is also connected to the microcontroller bus 475 to provide a communication link with external computer equipment having compatable hardware for wireless downloading of data. One such external computer is the Hewlett-Packard 100 LX palmtop computer. As illustrated, the RAM 465, the ROM 467 the power monitor 468 and the time keeper 469 are also connected to the microcontroller bus 475.

Several design features prevent tampering with the HUMS controller 460. The HUMS controller 460 can detect if it has been disconnected from the external power source 484 as follows. At regular time intervals, such as at 5-minute intervals, the timekeeper circuit 469 turns the system on and compares the programmed wake-up time to the current time in the timekeeper 469. If external power is not available, the system will not wake up. The next time power is reconnected to the system, the system will power up, check the current time in the timekeeper 469, and determine that the current time is past the last pre-set wake-up time. If a separation from power is detected, this event is entered into the episode log 418.

Equivalence

Those skilled in the art will know, or be able to ascertain using no more than routine experimentation, many equivalence to the specific embodiments of the invention described herein. These and all other equivalence are intended to be encompassed by the following claims.

We claim:

1. An aircraft control mechanism to control lateral and longitudinal movement of an aircraft comprising:

a pivot arm mounted on the aircraft at a pivot joint, the pivot arm rotatable about the pivot joint by a pilot;

a transverse member mounted on the arm above the pivot joint;

a frame rigidly mounted on the aircraft relative to the pivot joint;

a first bearing element connecting a first end of the transverse member to the rigid frame;

a second bearing element connecting a second end of the transverse member to the rigid frame; and a first and a second handle respectively coupled to the first end and the second end of the transverse member either handle actuating rotation of the pivot arm about the pivot joint through lateral and longitudinal movement of the transverse member relative to the pivot joint under control of the pilot.

2. The mechanism of claim 1 wherein the first handle is connected to the first bearing element.

3. The mechanism of claim 1 wherein the second handle is connected to the second bearing element.

4. The mechanism of claim 1 wherein the first and second bearing are rotatably mounted to opposite ends of the transverse member.

5. The mechanism of claim 1 wherein the first and second bearing elements are coupled to the frame with bearing joints such that the bearing elements rotate in two directions relative to the frame.

6. The mechanism of claim 1 wherein the first handle is connected to the first bearing element with a rigid control arm and the second handle is connected to the second bearing element with a second rigid control arm.

7. A helicopter control mechanism to effect lateral and longitudinal movement of a helicopter comprising:

a cyclic control mechanism coupled to a linkage control mechanism to effect movement of the helicopter in response to movement of the cyclic control mechanism by a pilot; and a dampening mechanism coupling the cyclic control mechanism to the linkage control mechanism to substantially reduce torsional and axial vibrational loads on the cyclic control mechanism, the dampening mechanism moving laterally and longitudinally in response to the movement of the cyclic control mechanism by the pilot.

8. The mechanism of claim 7 wherein the damping mechanism further provides central dampening to reduce vibration of the cyclic control mechanism.

9. The mechanism of claim 7 wherein the dampening mechanism is a four-bar mechanical system.

10. The mechanism of claim 9 wherein the four-bar mechanical system comprises:

a transverse member of the cyclic control mechanism;

a rigid bracket mounted below a crossbar member;

a first and second pivot mechanisms coupling the transverse member with the rigid bracket to transfer axial and torsional loads on the cyclic control mechanism to the rigid bracket from the transverse member.

11. The mechanism of claim 10 wherein each pivot mechanism is further coupled to a respective control tube of the cyclic control mechanism to reduce vibration in the control tubes.

12. The mechanism of claim 11 wherein each control tube has a hinge.

13. The mechanism of claim 11 wherein each control tube is a single rigid curved tubular member.

14. A method of controlling lateral and longitudinal movement of a helicopter comprising;

providing a pivot arm mounted on the helicopter at a pivot joint such that the pivot arm can be rotated about the joint in any direction by a pilot;

providing a transverse member mounted on the pivot arm above the pivot joint;

providing bearing elements each attached at one end to the transverse member and on opposite ends to a frame;

actuating movement of the pivot arm by the pilot with a first handle connected to one end of the transverse member or with a second handle connected to the opposite end of the transverse member, movement of either handle causing lateral and longitudinal movement of the transverse member relative to the pivot joint.

15. The method of claim 14 further comprising providing a rigid control arm between each handle and each bearing element.

16. The method of claim 14 further comprising providing to is connect each bearing element to the frame with a bearing.

17. The method of claim 14 further comprising providing a control arm having a hinge.

18. The method of claim 14 further comprising providing a frame extending between a first bearing joint mount and a second bearing joint mount.

19. The method of claim 18 further comprising providing a frame with an aperture through which the pivot arm extends.

20. The method of claim 14 further comprising dampening axial and torsional vibrations in the pivot arm with the transverse member, bearing elements and frame.

* * * * *